US012549934B2

(12) United States Patent
Ding et al.

(10) Patent No.: US 12,549,934 B2
(45) Date of Patent: Feb. 10, 2026

(54) METHOD FOR DETERMINING POLICY CONTROL NETWORK ELEMENT, APPARATUS, AND SYSTEM

(71) Applicant: Huawei Technologies Co., Ltd., Shenzhen (CN)

(72) Inventors: Hui Ding, Xi'an (CN); Shufeng Shi, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 416 days.

(21) Appl. No.: 17/902,112

(22) Filed: Sep. 2, 2022

(65) Prior Publication Data
US 2022/0417724 A1   Dec. 29, 2022

Related U.S. Application Data

(63) Continuation of application No. PCT/CN2021/078661, filed on Mar. 2, 2021.

(30) Foreign Application Priority Data

Mar. 3, 2020 (CN) .......................... 202010140800.9

(51) Int. Cl.
*H04W 8/08* (2009.01)
*H04W 60/04* (2009.01)
(Continued)

(52) U.S. Cl.
CPC ............. *H04W 8/08* (2013.01); *H04W 60/04* (2013.01); *H04W 48/16* (2013.01); *H04W 48/18* (2013.01)

(58) Field of Classification Search
CPC .............................. H04W 8/08; H04L 41/0894
See application file for complete search history.

(56) References Cited

U.S. PATENT DOCUMENTS

2019/0053104 A1   2/2019   Qiao et al.
2019/0109823 A1*  4/2019   Qiao ................. H04M 15/8016

FOREIGN PATENT DOCUMENTS

CN           110048867 A      7/2019
CN           110149603 A      8/2019
WO    WO-2019137555 A1 *   7/2019   ........... H04L 67/145

OTHER PUBLICATIONS

3GPP TS 23.501 V16.3.0, Dec. 2019, 3rd Generation Partnership Project; Technical Specification Group Services and System Aspects; System architecture for the 5G System (5GS); Stage 2 (Release 16), 417 pages.

(Continued)

*Primary Examiner* — Huy D Vu
*Assistant Examiner* — Latha Chakravarthy
(74) *Attorney, Agent, or Firm* — Conley Rose, P.C.

(57) ABSTRACT

A method for determining a policy control network element, in which a mobility management network element obtains first indication information, where the first indication information indicates to select a same policy control network element as a policy control network element for access and mobility management and a policy control network element for session management; the mobility management network element receives a session establishment request from a terminal for establishing a first session; and the mobility management network element sends second indication information and information about a first policy control network element to a session management network element based on the first indication information, where the second indication information indicates to select a same policy control network element as a policy control network element used for access and mobility management and a policy control network element used for session management of the first session.

16 Claims, 10 Drawing Sheets

(51) Int. Cl.
   *H04W 48/16* (2009.01)
   *H04W 48/18* (2009.01)

(56) References Cited

OTHER PUBLICATIONS

3GPP TS 23.502 V16.3.0, Dec. 2019, 3rd Generation Partnership Project; Technical Specification Group Services and System Aspects; Procedures for the 5G System (5GS); Stage 2 (Release 16), 558 pages.
3GPP TS 23.503 V16.3.0, Dec. 2019, 3rd Generation Partnership Project; Technical Specification Group Services and System Aspects; Policy and charging control framework for the 5G System (5GS); Stage 2 (Release 16), 112 pages.
China Telecom, "Discussion the usage of the same PCF for AMF and SMF in SGS", SA WG2 Meeting #136AH, S2-2000330, Jan. 13-17, 2020, Incheon, Korea, 2 pages.

* cited by examiner

METHOD FOR DETERMINING POLICY CONTROL NETWORK ELEMENT, APPARATUS, AND SYSTEM

CROSS-REFERENCE TO RELATED APPLICATIONS

This is a continuation of International Patent Application No. PCT/CN2021/078661, filed on Mar. 2, 2021, which claims priority to Chinese Patent Application No. 202010140800.9, filed on Mar. 3, 2020. The disclosures of the aforementioned applications are hereby incorporated by reference in their entireties.

TECHNICAL FIELD

This application relates to the field of communication technologies, and in particular, to a method for determining a policy control network element, an apparatus, and a system.

BACKGROUND

In a 5th generation (5G) communication system, a policy control function (PCF) network element connected to an access and mobility management function (AMF) network element is a PCF (namely, an access and mobility (AM) PCF) that can provide access and mobility control, or may be a PCF (namely, a user equipment (UE) PCF) that provides UE policy control. Therefore, the PCF network element connected to the AMF network element corresponds to the AM PCF and the UE PCF. For ease of description below, the PCF network element connected to the AMF is referred to as the AM PCF for short, to represent a PCF network element (or referred to as an instance) that can provide both the UE policy and the AM policy. A PCF network element connected to a session management function (SMF) network element is a PCF network element that can provide a session management policy (SM Policy), and is corresponding to an SM PCF.

When a UE performs access through 5G, including a handover from a $4^{th}$ generation (4G) communication system to the 5G communication system, the AM PCF selected by the AMF and the SM PCF selected by the SMF may not be a same PCF network element. In actual implementation, because the SM PCF is responsible for performing statistics collection based on a quantity of users, the operator may require the AM PCF to perform corresponding UE policy or AM policy adjustment based on a result of performing an SM policy by the SM PCF. However, because there is no direct connection interface between the AM PCF and the SM PCF, the SM PCF needs to push the current SM policy performing result to the AM PCF using a unified data repository (UDR) network element. However, currently, the UDR is only used as a database node. Forwarding of the foregoing information using the UDR inevitably causes excessively complex implementation of the UDR, and the link also causes unnecessary signaling overheads.

SUMMARY

Embodiments of this application provide a method for determining a policy control network element, an apparatus, and a system, to implement flexible policy association.

To achieve the foregoing objective, embodiments of this application provide the following technical solutions.

According to a first aspect, a method for determining a policy control network element is provided. The method includes: A mobility management network element obtains first indication information, where the first indication information indicates to select a same policy control network element as a policy control network element used for access and mobility management and a policy control network element used for session management; the mobility management network element receives from a terminal, a session establishment request for establishing a first session; and the mobility management network element sends second indication information and information about a first policy control network element to a session management network element based on the first indication information, where the second indication information indicates to select a same policy control network element as a policy control network element used for access and mobility management and a policy control network element used for session management of the first session, where the information about the first policy control network element is used by the session management network element to use a first policy control network element corresponding to the information about the first policy control network element as a second policy control network element of the first session, where the first policy control network element is a policy control network element configured to provide access and mobility management for the terminal, and where the second policy control network element is a policy control network element configured to provide session management for the first session. Using the foregoing solution, flexible policy association can be implemented.

In an implementation, the first indication information is associated with a first data network name (DNN) and/or first single network slice selection assistance information (S-NSSAI). Correspondingly, the session establishment request carries the first DNN and/or the first S-NSSAI; and the mobility management network element determines that the first indication information is applicable to the first DNN and/or the first S-NSSAI carried in the session establishment request.

In an implementation, the mobility management network element obtains the first indication information from a unified data management network element.

In an implementation, the mobility management network element obtains the first indication information from a mobility management network element before a mobility change.

In an implementation, the mobility management network element sends a network element discovery request to a network repository function network element, where the network element discovery request carries function requirement information of the policy control network element configured to provide access and mobility management for the terminal and the policy control network element configured to provide session management for a session of the terminal; and the mobility management network element receives the information about the first policy control network element returned by the network repository function network element, where the first policy control network element supports providing functions of the first policy control network element and the second policy control network element.

According to a second aspect, another method for determining a policy control network element is provided in this application. The method includes: A session management network element receives a session management request of a first session from a mobility management network element; and the session management network element sends, to the mobility management network element based on second indication information, a session management response that carries information about a second policy control network element, where the second indication information indicates to select a same policy control network element as a policy control network element used for access and mobility management and a policy control network element used for session management of the first session, where the information about the second policy control network element is used by the mobility management network element to use a policy control network element corresponding to the information about the second policy control network element as a first policy control network element, where the first policy control network element is a policy control network element configured to provide access and mobility management for the terminal, and where the second policy control network element is a policy control network element configured to provide session management for the first session. Using the foregoing solution, flexible policy association can be implemented.

In an implementation, the session management network element obtains the second indication information from a unified data management network element.

In an implementation, the session management network element obtains the second indication information from a mobility management network element before a mobility change.

In an implementation, the session management response further carries third indication information, where the third indication information is used by the mobility management network element to determine to select a policy control network element corresponding to the information about the second policy control network element as the policy control network element configured to provide session management for the first session.

According to a third aspect, another method for determining a policy control network element is provided in this application. The method includes: A mobility management network element receives a mobility change request, where the mobility change request carries first indication information, where the first indication information indicates to select a same policy control network element as a policy control network element used for access and mobility management and a policy control network element used for session management; the mobility management network element sends, to a session management network element corresponding to a first session of a terminal, a session management request that carries second indication information, where the second indication information indicates to select a same policy control network element as a policy control network element used for access and mobility management and a policy control network element used for session management of the first session; the mobility management network element receives a session management response from the session management network element, and the session management response carries information about a first policy control network element that provides session management for the terminal; and the mobility management network element sends a session management policy association establishment request to the first policy control network element, where the session management policy association establishment request is used to trigger to establish access management policy association.

In an implementation, the first indication information is associated with a DNN and/or first S-NSSAI; and the mobility management network element determines that the first indication information is applicable to a DNN and/or S-NSSAI corresponding to the first session.

According to a fourth aspect, a communication apparatus is provided, to implement the foregoing methods. The communication apparatus may be the mobility management network element in the first aspect or the third aspect, or an apparatus including the mobility management network element. Alternatively, the communication apparatus may be the session management network element in the second aspect, or an apparatus including the session management network element. The communication apparatus includes a corresponding module, unit, or means for implementing the foregoing methods. The module, unit, or means may be implemented using hardware or software, or implemented using hardware by executing corresponding software. The hardware or the software includes one or more modules or units corresponding to the foregoing functions.

According to a fifth aspect, a communication apparatus is provided, including a processor and a memory. The memory is configured to store computer instructions, and when the processor executes the instructions, the communication apparatus is enabled to perform the method according to any one of the foregoing aspects. The communication apparatus may be the mobility management network element in the first aspect or the third aspect, or an apparatus including the mobility management network element. Alternatively, the communication apparatus may be the session management network element in the second aspect, or an apparatus including the session management network element.

According to a sixth aspect, a communication apparatus is provided. The communication apparatus includes a processor. The processor is configured to: be coupled to a memory; and after reading instructions in the memory, perform the method according to any one of the foregoing aspects according to the instructions. The communication apparatus may be the mobility management network element in the first aspect or the third aspect, or an apparatus including the mobility management network element. Alternatively, the communication apparatus may be the session management network element in the second aspect, or an apparatus including the session management network element.

According to a seventh aspect, a computer-readable storage medium is provided. The computer-readable storage medium stores instructions. When the instructions are run on a computer, the computer is enabled to perform the method according to any one of the foregoing aspects.

According to an eighth aspect, a computer program product including instructions is provided. When the computer program product runs on a computer, the computer is enabled to perform the method according to any one of the foregoing aspects.

According to a ninth aspect, a communication apparatus is provided (for example, the communication apparatus may be a chip or a chip system). The communication apparatus includes a processor configured to implement a function according to any one of the foregoing aspects. In a possible design, the communication apparatus further includes a memory, and the memory is configured to store necessary program instructions and data. When the communication apparatus is a chip system, the communication apparatus may include a chip, or may include a chip and another discrete component.

For technical effects brought by any one of the designs of the fourth aspect to the ninth aspect, refer to technical effects brought by different designs of the first aspect or the second aspect. Details are not described herein again.

According to a tenth aspect, a system for determining a policy control network element is provided, including: a mobility management network element and a session management network element, where the mobility management network element is configured to obtain first indication information, where the first indication information indicates to select a same policy control network element as a policy control network element used for access and mobility management and a policy control network element used for session management; receive a session establishment request from a terminal for establishing a first session; and send second indication information and information about a first policy control network element to the session management network element based on the first indication information, where the second indication information indicates to select a same policy control network element as a policy control network element used for access and mobility management and a policy control network element used for session management of the first session; and the information about the first policy control network element is used by the session management network element to use a first policy control network element corresponding to the information about the first policy control network element as a second policy control network element for the first session, where the first policy control network element is a policy control network element configured to provide access and mobility management for the terminal, and the second policy control network element is a policy control network element configured to provide session management for the first session; and the session management network element is configured to receive the second indication information and the information about the first policy control network element.

According to an eleventh aspect, a system for determining a policy control network element is provided, including: a mobility management network element and a session management network element, where the mobility management network element is configured to send a session management request of a first session to the session management network element; and the session management network element is configured to receive the session management request and send, to the mobility management network element based on second indication information, a session management response that carries information about a second policy control network element, where the second indication information indicates to select a same policy control network element as a policy control network element used for access and mobility management and a policy control network element used for session management of the first session; and the information about the second policy control network element is used by the mobility management network element to use a policy control network element corresponding to the information about the second policy control network element as a first policy control network element, where the first policy control network element is a policy control network element configured to provide access and mobility management for the terminal, and the second policy control network element is a policy control network element configured to provide session management for the first session.

These aspects or other aspects of this application are clearer and more comprehensible in descriptions of the following embodiments.

DESCRIPTION OF EMBODIMENTS

The following describes technical solutions in embodiments of this application with reference to the accompanying drawings in embodiments of this application. In the descriptions of this application, unless otherwise specified, "l" indicates an "or" relationship between associated objects. For example, AB may indicate A or B. In this application, "and/or" describes only an association relationship between associated objects and indicates that three relationships may exist. For example, A and/or B may indicate the following three cases: Only A exists, both A and B exist, and only B exists, where A or B may be singular or plural. In addition, in the descriptions of this application, "a plurality of" means two or more than two unless otherwise specified. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in embodiments of this application, words such as "first" and "second" are used in embodiments of this application to distinguish between same items or similar items that have basically the same functions or purposes. A person skilled in the art may understand that the terms such as "first" and "second" do not limit a quantity or an execution sequence, and the terms such as "first" and "second" do not indicate a definite difference. In addition, in embodiments of this application, the word such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word such as "example" or "for example" is intended to present a relative concept in a manner for ease of understanding.

In addition, the network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

Figure 1:
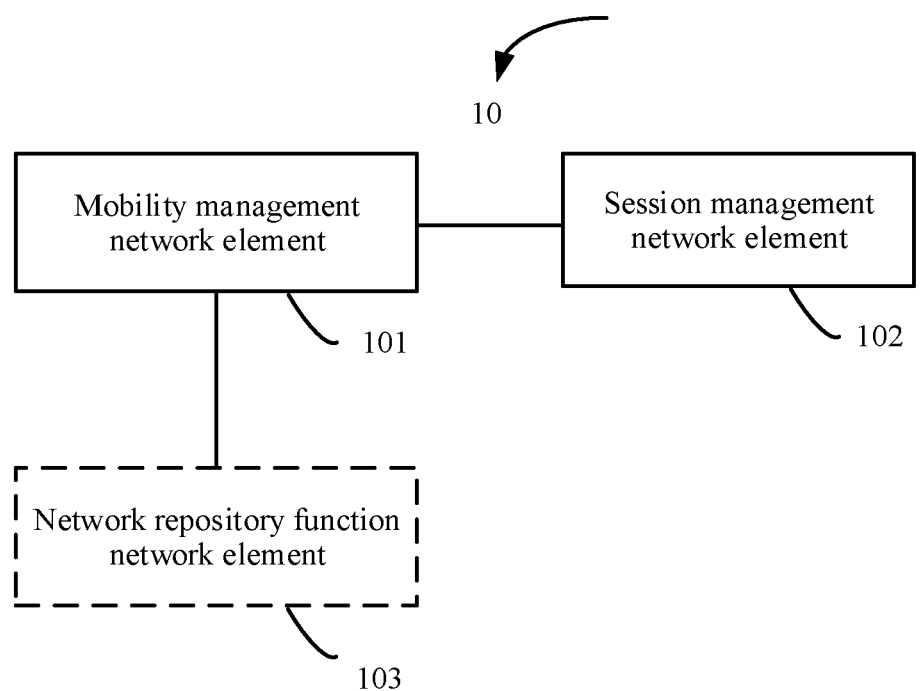
FIG. 1 is a schematic diagram of a possible system network according to an embodiment of this application.

As shown in FIG. 1, an embodiment of this application provides a system 10 for determining a policy control network element. The system 10 includes a mobility management network element 101 and a session management network element 102. The mobility management network element 101 and the session management network element 102 may directly communicate with each other, or may communicate with each other through forwarding by another device. This is not specifically limited in this embodiment of this application.

Solution 1

In a possible implementation, the mobility management network element 101 is configured to: obtain first indication information, where the first indication information indicates to select a same policy control network element as a policy control network element for access and mobility management and a policy control network element for session management; receive a session establishment request from a terminal for establishing a first session; and send second indication information and information about a first policy control network element to the session management network element 102 based on the first indication information, where the second indication information indicates to select a same policy control network element as a policy control network element used for access and mobility management and a policy control network element used for session management of the first session; and the information about the first policy control network element is used by the session management network element to use a first policy control network element corresponding to the information about the first policy control network element as a second policy control network element of the first session, where the first policy control network element is a policy control network element configured to provide access and mobility management for the terminal, and the second policy control network element is a policy control network element configured to provide session management for the first session; and the session management network element 102 is configured to receive the second indication information and the information about the first policy control network element.

The first indication information may also be referred to as policy control network element selection indication information. The name is not specifically limited in this application.

Alternatively, the information about the first policy control network element may be an identifier of the first policy control network element, an Internet Protocol (IP) address of the first policy control network element, a fully qualified domain name (FQDN) of the first policy control network element, a uniform resource locator (URL) of the first policy control network element, or the like. This is not specifically limited in this embodiment of this application.

The first indication information and the second indication information may be same information, or may be different information. For example, if the first indication information is for all sessions of a same terminal, the first indication information and the second indication information may be same information. This is not limited herein.

In another possible implementation, the session management network element 102 is further configured to use the first policy control network element as the second policy control network element of the first session.

In another possible implementation, the first indication information is associated with a first DNN and/or first S-NSSAI. Correspondingly, if the session establishment request message carries the first DNN and/or the first S-NSSAI, the mobility management network element 101 is further configured to determine that the first indication information is applicable to the first DNN and/or the first S-NSSAI.

There are a plurality of implementations in which the first indication information is associated with the first DNN and/or the first S-NSSAI in implementation.

Implementation 1: The first indication information further includes a data network name (DNN) and/or single network slice selection assistance information (S-NSSAI).

For example, if the first indication information includes the DNN, it may be understood as that the first indication information is used for a plurality of sessions corresponding to the DNN. In other words, for the sessions at a DNN granularity, a same policy control network element is selected as a policy control network element used for access and mobility management and a policy control network element used for session management. If the first indication information includes the S-NSSAI, it may be understood as that the first indication information is used for a plurality of sessions corresponding to the S-NSSAI. If the first indication information includes a usage control enabling indication, it indicates that for a session for which usage monitoring is enabled, a same policy control network element is selected as a policy control network element used for access and mobility management and a policy control network element used for session management.

If the session establishment request message carries the first DNN and/or the first 5-NSSAI, the mobility management network element 101 is further configured to determine that the first indication information is applicable to the first DNN and/or the first S-NSSAI. Then the mobility management network element 101 is configured to send the second indication information and the information about the first policy control network element to the session management network element 102.

Implementation 2: The DNN and the S-NSSAI are not included in the first indication information, but there is an association relationship or a correspondence between the DNN and the S-NSSAI. For example, the first indication information corresponds to the DNN and the S-NSSAI.

In another possible implementation, determining that the first indication information is applicable to the first DNN and/or the first S-NSSAI may be performed in the following manner: determining that a DNN/S-NSSAI corresponding to the first session is consistent with the DNN/S-NSSAI associated with the first indication information.

In another possible implementation, the system further includes a unified data management network element 103. The mobility management network element 101 is configured to obtain the first indication information from the unified data management network element.

In another possible implementation, if the mobility management network element is a mobility management network element after a mobility change, the mobility management network element is further configured to obtain the first indication information from a mobility management network element before the mobility change. The mobility management network element before the mobility change may be a mobility management network element that serves the terminal before handover in a handover scenario, or a mobility management network element that serves the terminal before movement in a mobility registration scenario.

In another possible implementation, the system further includes a network repository function network element 104. The mobility management network element 101 is further configured to send a network element discovery request to a network repository function network element 103, where the network element discovery request carries function requirement information of a policy control network element configured to provide access and mobility management for the terminal and a policy control network element configured to provide session management for a session of the terminal. The network repository function network element 104 is configured to receive the network element discovery request, and send the information about the first policy control network element to the mobility management network element 101, and the first policy control network element supports providing functions of the first policy control network element and the second policy control network element.

The function requirement information may be a function requirement of the policy control network element used to provide access and mobility management for the terminal and a function requirement of the policy control network element used to provide session management for the session of the terminal; or may be service information supported by the policy control network element used to provide access and mobility management for the terminal and service information supported by the policy control network element used to provide session management for the session of the terminal.

Solution 2

In a possible implementation, the session management network element 102 is configured to receive a session management request of a first session from the mobility management network element 101; the session management network element 102 is configured to send, to the mobility management network element 101 based on the second indication information, a session management response that carries information about the second policy control network element, where the second indication information indicates to select a same policy control network element as a policy control network element used for access and mobility management and a policy control network element used for session management of the first session; and the information about the second policy control network element is used by the mobility management network element to use a policy control network element corresponding to the information about the second policy control network element as the first policy control network element; and the mobility management network element 101 is configured to receive the session management response from the session management network element 102.

The first indication information may also be referred to as policy control network element selection indication information. The name is not specifically limited in this application.

Alternatively, the information about the second policy control network element may be an identifier of the second policy control network element, an IP address of the second policy control network element, an FQDN of the second policy control network element, a URL of the second policy control network element, or the like. This is not specifically limited in this embodiment of this application.

In another possible implementation, the session management request may be a session context create request or a session context update request message.

In another possible implementation, the session management network element 102 is further configured to: determine, based on the second indication information, that the information about the second policy control network element needs to be provided to the mobility management network element; or determine that a second policy control network element selected for the first session needs to be provided as the first policy control network element.

In another possible implementation, the session management request further carries the second indication information.

In another possible implementation, the session management response further carries third indication information, where the third indication information is used by the mobility management network element 101 to determine to select a policy control network element corresponding to the information about the second policy control network element as a policy control network element configured to provide session management for the first session.

In another possible implementation, the system further includes a unified data management network element 103. The mobility management network element 101 is configured to obtain the first indication information from the unified data management network element.

In another possible implementation, the mobility management network element 101 is further configured to receive a mobility change request, where the mobility change request carries the first indication information.

In another possible implementation, the session management network element 102 is further configured to: obtain the second indication information from the unified data management network element; or obtain the second indication information from a mobility management network element before a mobility change.

In another possible implementation, the mobility management network element 101 is further configured to send an access and mobility management policy association establishment request to a second policy control network element corresponding to the information about the second policy control network element carried in the session management response, where the access and mobility management policy association establishment request is used to trigger creation of an access and mobility management policy association.

Using the foregoing solution 1 or solution 2, flexible policy association can be implemented without introducing network architecture complexity. The policy control network element configured to provide access and mobility management and the policy control network element configured to provide session management for the first session of the terminal are selected as a same policy control network element. In this case, the policy control network element configured to provide access and mobility management may execute a corresponding terminal policy or adjust an access and mobility related policy based on a result of session management performed by the policy control network element configured to provide session management for the first session.

For example, when usage of the terminal is used up, modification of an access technology/frequency selection policy (RFSP) of the terminal may be triggered, such that a base station side triggers the terminal to perform cell reselection, to be handed over to another access technology or another low-priority cell for access. Alternatively, when usage of the UE in a slice is used up, a terminal policy is adjusted to prevent the terminal from continuing to access the network using the slice.

For another example, the terminal may respectively establish two sessions at a same moment in an enhanced mobile broadband (eMBB) slice and an internet-of-vehicles slice (e.g., a vehicle-to-everything (V2X) slice), and the two sessions correspond to two SMF network elements and two SM PCFs. For the preceding two slices, an operator may enable usage control only for the eMBB slice. In a V2X scenario, a value-added service is provided mainly by guaranteeing bandwidth. A PCF corresponding to the session in the eMBB slice is used as the AM PCF, such that the foregoing policy association can be implemented without complicating a network architecture.

An implementation of the foregoing solution is described in detail in following method embodiments. Details are not described herein again.

Figure 2A:
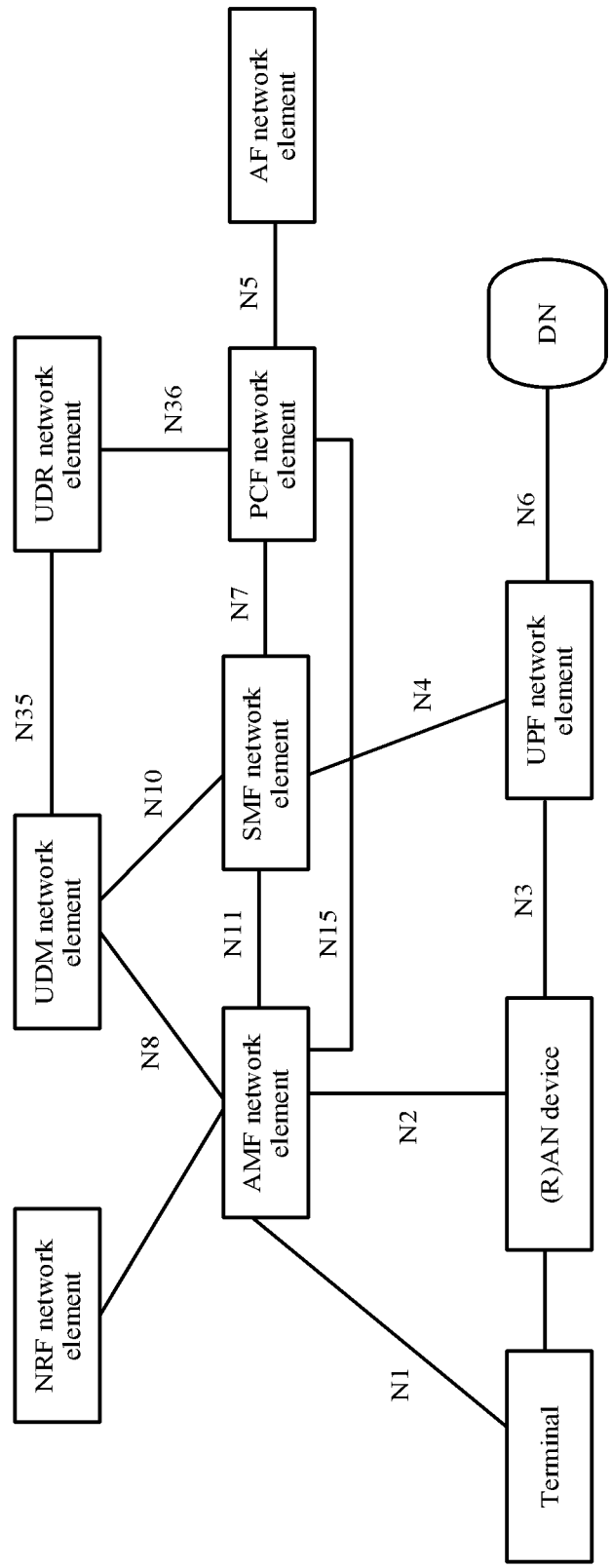
FIG. 2A is a schematic diagram of another possible system network according to an embodiment of this application.
Figure 2B:
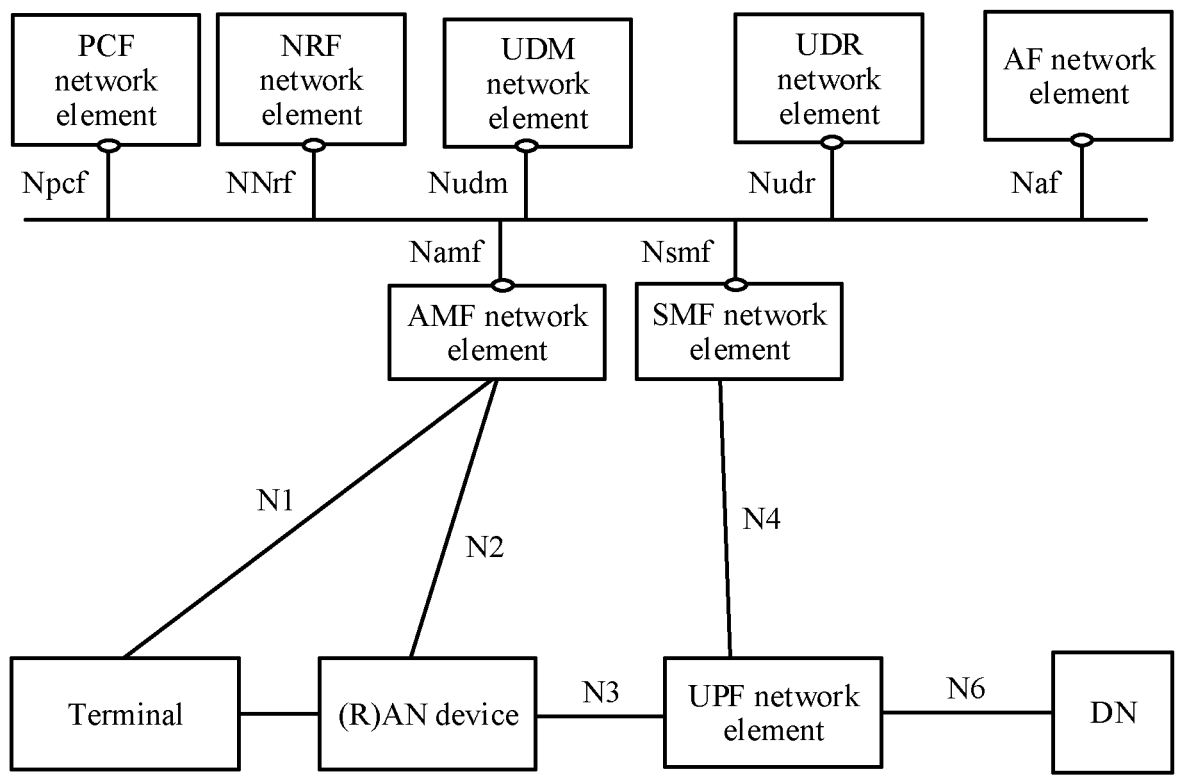
FIG. 2B is a schematic diagram of another possible system network according to an embodiment of this application.

The system shown in FIG. 1 may be used in the 5G network architecture shown in FIG. 2A or FIG. 2B, and certainly may also be used in a future network architecture, for example, a 6G network architecture. This is not limited in this application.

For example, it is assumed that the communication system 10 shown in FIG. 1 is applied to a 5G network architecture. As shown in FIG. 2A, a network element or an entity corresponding to the session management network element may be an SMF network element in the 5G network architecture, and a network element or an entity corresponding to the mobility management network element may be an AMF network element in the 5G network architecture. Further, a network element or an entity corresponding to the data management network element may be a unified data management (UDM) network element in the 5G network architecture, a network element or an entity corresponding to the policy control network element may be a PCF network element in the 5G network architecture, and a network element or an entity corresponding to the network repository function network element may be a network repository function (NRF) network element in the 5G network architecture.

In addition, as shown in FIG. 2A, the 5G network architecture may further include a (radio) access network ((R)AN) device, a user plane function (UPF) network element, a UDR network element, an application function (AF) network element, or the like. This is not specifically limited in this embodiment of this application.

The terminal communicates with the AMF network element through a next generation network (next generation, N) 1 interface (N1 for short). The (R)AN device communicates with the AMF network element through an N2 interface (N2 for short). The RAN device communicates with the UPF network element through an N3 interface (N3 for short). The UPF network element communicates with a data network (DN) through an N6 interface (N6 for short). The AMF network element communicates with the SMF network element through an N11 interface (N11 for short). The AMF network element communicates with a PCF network element through an N15 interface (N15 for short). The AMF network element communicates with the UDM network element through an N8 interface (N8 for short). The SMF network element communicates with the PCF network element through an N7 interface (N7 for short). The SMF network element communicates with the UPF network element through an N4 interface (N4 for short). The SMF network element communicates with the UDM network element through an N10 interface (N10 for short). The PCF network element communicates with the AF network element through an N5 interface (N5 for short).

In the figure shown in FIG. 2A, the AMF network element and the SMF network element are connected to a same PCF network element. In actual implementation, if an AM PCF network element and an SM PCF are different, the AMF network element may be connected to another PCF network element through the N15 interface, and then the PCF network element is connected to the UDR network element through an N36 interface.

The N15 interface is mainly configured to deliver a terminal policy and an access and mobility management policy. Currently, the terminal policy mainly includes two policies: an access network discovery and selection policy (ANDSP) and a UE route selection policy (URSP), and is provided by the PCF network element to the terminal using the AMF network element. The ANDSP policy is mainly used by the terminal to select an access network and an access network element when the terminal accesses a non-3rd Generation Partnership Project (non-3 GPP) network. The URSP policy is a UE route selection policy and is a policy rule used by the terminal to select a corresponding routing parameter when the terminal initiates an application or a service, for example, a DNN, S-NSSAI, and a service continuity mode (SSC Mode) that are required for selecting the application or the service.

An access and mobility management policy is provided by the AM PCF and includes a service area restriction and an RFSP. The service area restriction mainly includes information such as an access-allowed area and an access-forbidden area. For example, a user is forbidden to access an operator network in a special control area. The RFSP is mainly used for performing access mode and frequency selection. If some cells are congested, the RFSP policy is adjusted to migrate users in congested cells to another cell.

The N7 interface is mainly configured to deliver an SM policy, where the SM policy may include information such as quality of service (QoS), charging control, and flow forwarding control at a service flow or session level, and specific forms include a policy control and charging rule (PCC rule) at the service flow level and session policy control information of a protocol data unit (PDU) at the session level, which are used by the SMF network element to perform corresponding measures such as QoS guarantee, charging or usage statistics collection, flow control on the service flow or the flow in the session.

The N11 interface is mainly configured to: transfer PDU session tunnel information between the RAN and the UPF, transfer a control message to be sent to the terminal, transfer radio resource control information to be sent to the RAN, and the like.

In addition, it should be noted that control plane network elements such as the AMF network element, the SMF network element, or the PCF network element in the 5G network architecture shown in FIG. 2A may alternatively interact with each other through a service-based interface. For example, as shown in FIG. 2B, an external service-based interface provided by the AMF network element may be Namf, an external service-based interface provided by the SMF network element may be Nsmf, an external service-based interface provided by the PCF network element may be Npcf, an external service-based interface provided by the UDM network element may be Nudm, an external service-based interface provided by the UDR network element may be Nudr, and an external service-based interface provided by the AF network element may be Naf. For related descriptions, refer to a 5G system architecture in the standard 23501. Details are not described herein.

Figure 3:
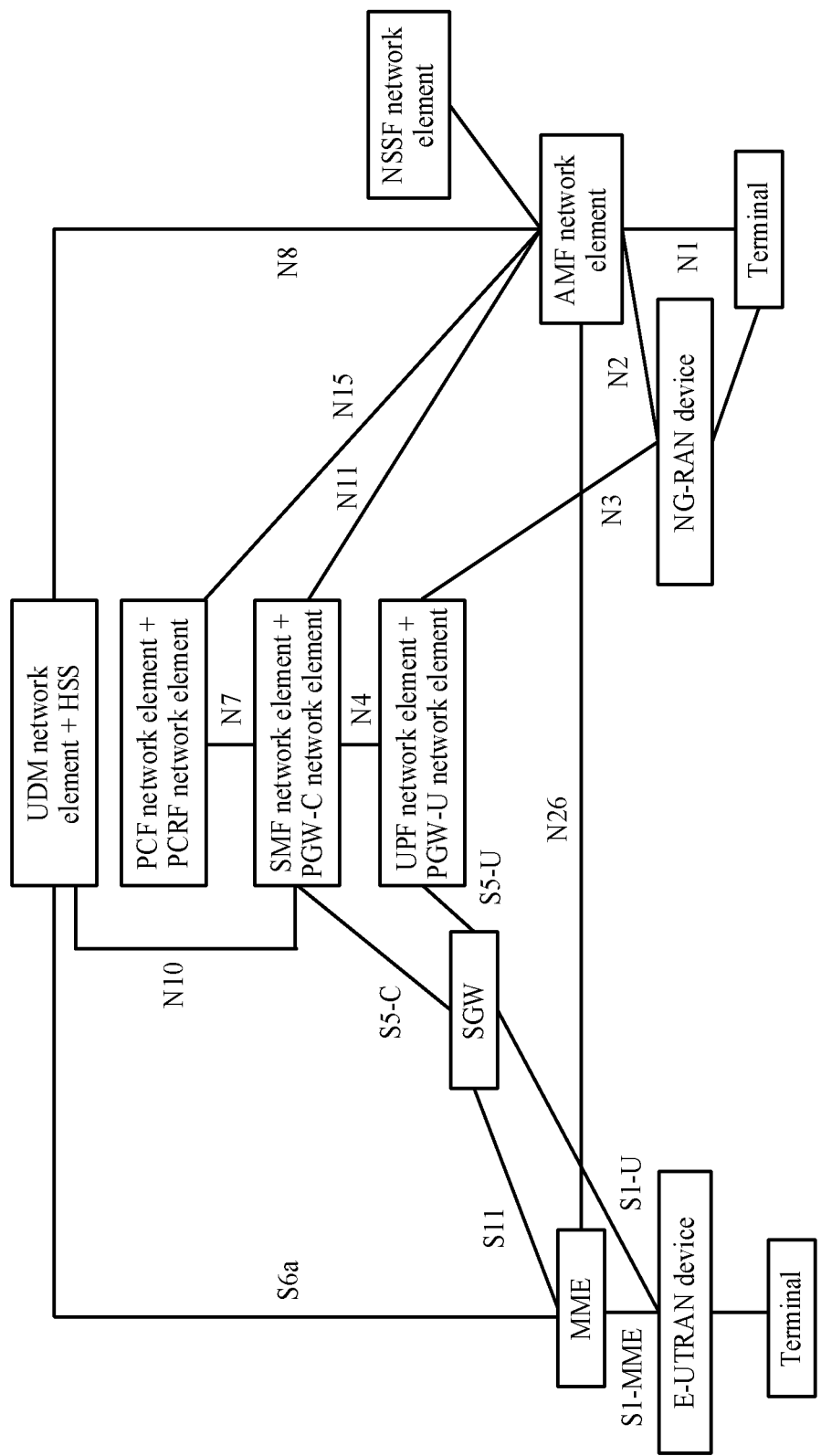
FIG. 3 is a schematic diagram of another possible system network according to an embodiment of this application.

For example, it is assumed that the communication system 10 shown in FIG. 1 is applied to a 4G-5G converged network architecture, as shown in FIG. 3, a network element or an entity corresponding to the session management network element may be an SMF network element+a PDN gateway control plane function (PGW-C) network element in the converged network architecture, and a network element or an entity corresponding to the mobility management network element may be an AMF network element or a mobility management entity (MME) in the converged network architecture. Further, a network element or an entity corresponding to the data management network element may be a UDM+home subscriber server (HSS) network element in the converged network architecture, and a network element or an entity corresponding to the policy control network element may be a PCF network element+a policy and charging rules function (PCRF) network element in the converged network architecture.

In the network architecture shown in FIG. 3, to implement interworking between the 5G system and the third generation (3G) mobile communication system and an evolved packet system (EPS), the network architecture in the embodiments of this application may further include an MME in the EPS, and the MME communicates with the SMF network element through an N26 interface (N26 for short). Certainly, the network architecture in embodiments of this application may further include another network element or device in the EPS, for example, an evolved universal mobile telecommunications system (UMTS), an evolved UMTS terrestrial radio access network (E-UTRAN) device, a packet data network (PDN) gateway (PGW) user plane function (PGW-U) network element, a PGW control plane (PGW-C) network element, a PCRF network element, or an HSS. This is not specifically limited in this embodiment of this application.

In a possible implementation, some network elements in the architecture for interworking between the 5GS and the EPS may be deployed in an integrated manner. For example, FIG. 3 is a schematic diagram of an existing architecture of interworking between the 5GS and the EPS. The 5GS and EPS share the UPF network element+the PGW-U network element, the SMF network element+the PGW-C network element, the PCF network element+the PCRF network element, and the UDM network element+the HSS. Herein, "+" represents an integrated configuration. A UPF is a user plane function of the 5GS, and a PGW-U is a gateway user plane function that is of the EPS and that is corresponding to the UPF. An SMF is a session management function of the 5GS, and a PGW-C is a gateway control plane function that is of the EPS and that is corresponding to the SMF. A PCF is a policy control function of the 5GS, and a PCRF is a policy and charging rules function that is of the EPS and that is corresponding to the PCF.

In addition, as shown in FIG. 3, the architecture for interworking between the 5GS and the EPS may further include the MME and a serving gateway (SGW) in the EPS, and an AMF network element in the 5GS. Optionally, the architecture of interworking between the 5GS and the EPS may further include a network slice selection function (NSSF) network element and some network elements that are not shown, for example, an NEF network element. This is not specifically limited in this embodiment of this application.

As shown in FIG. 3, in this embodiment of this application, a terminal accesses the EPS using an E-UTRAN device, and the terminal accesses the 5GS using a next-generation radio access network (NG-RAN) device. The E-UTRAN device communicates with the MME through an S1-MME interface. The E-UTRAN device communicates with the SGW through an S1-U interface. The MME communicates with the SGW through an S11 interface. The MME communicates with the UDM network element+the HSS through an S6a interface. The MME communicates with the AMF network element through an N26 interface. The SGW communicates with the UPF network element+the PGW-U network element through an S5-U interface. The SGW communicates with the SMF network element+the PGW-C network element through an S5-C interface. The UPF network element+the PGW-U network element communicate with the NG-RAN device through an N3 interface. The UPF network element+PGW-U network element communicate with the SMF network element+PGW-C network element through the N4 interface. The SMF network element+the PGW-C network element communicate with the PCF network element+the PCRF network element through the N7 interface. The UDM network element+the HSS communicate with the SMF network element+the PGW-C network element through the N10 interface. The UDM network element+the HSS communicate with the AMF network element through an N8 interface. The PCF network element+the PCRF network element communicate with the AMF network element through an N15 interface. The SMF network element+the PGW-C network element communicate with the AMF network element through an N11 interface. The AMF network element communicates with the NG-RAN device through an N2 interface. The AMF network element communicates with the terminal through an N1 interface.

It should be noted that FIG. 3 is merely a schematic diagram of an existing architecture for interworking between the 5GS and the EPS. Certainly, there may be another architecture for interworking between the 5GS and the EPS. This is not specifically limited in this embodiment.

In a 5G-to-5G handover scenario, a mobility management network element before the mobility change is an AMF network element in the 5G network before handover. In a 4G-to-5G handover scenario, a mobility management network element before the mobility change is an MME network element in the 4G network before handover. In a 5G-to-5G mobility registration scenario, a mobility management network element before the mobility change is an AMF network element in the 5G network before movement. In a 4G-to-5G mobility registration scenario, a mobility management network element before the mobility change is an MME network element in the 4G network before handover.

In implementation, the terminal in embodiments of this application may be a device configured to implement a wireless communication function, for example, a terminal device or a chip applicable in the terminal device. The terminal may be a user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. The terminal may be mobile or fixed.

In implementation, a related function of the mobility management network element or the session management network element in embodiments of this application may be implemented by one device, or may be jointly implemented by a plurality of devices, or may be implemented by one or more functional modules in one device. This is not specifically limited in embodiments of this application. It may be understood that the foregoing function may be a network element in a hardware device, may be a software function running on dedicated hardware, a combination of hardware and software, or a virtualization function instantiated on a platform (for example, a cloud platform).

Figure 4:
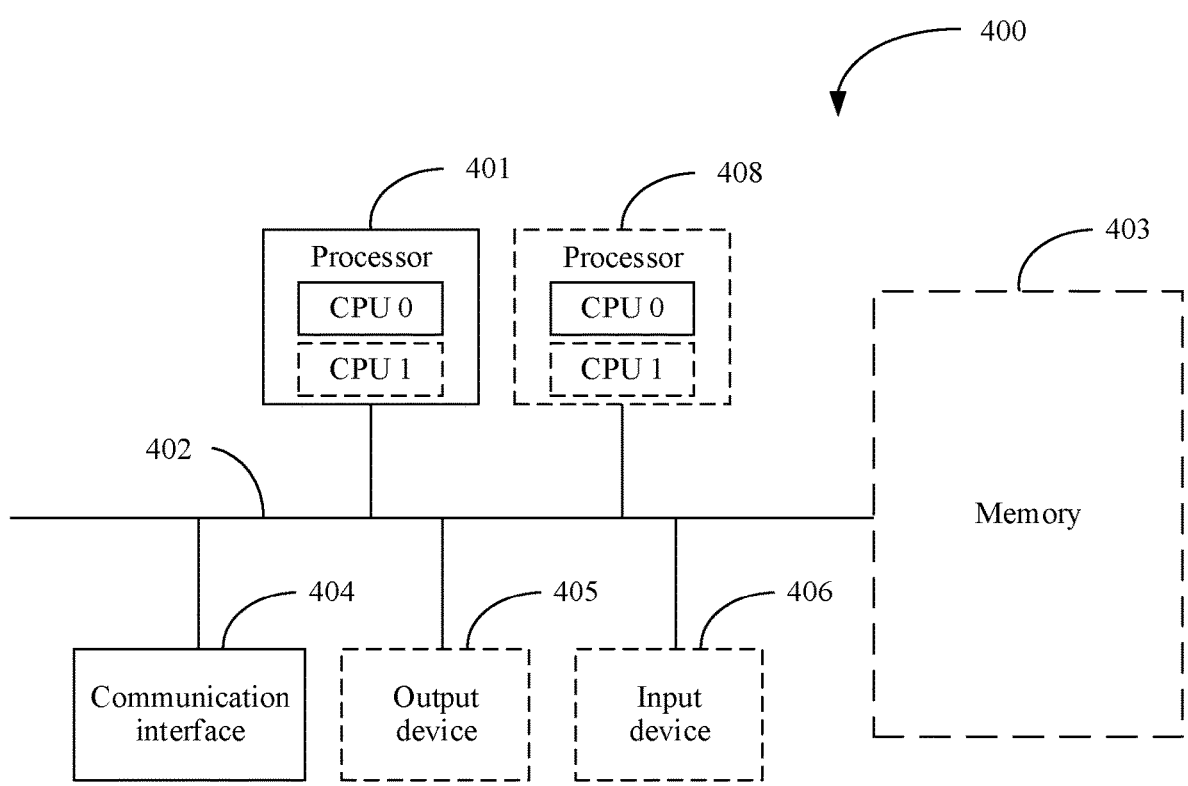
FIG. 4 is a schematic diagram of a computer device according to an embodiment of this application.

For example, the related function of the mobility management network element or the session management network element in this embodiment of this application may be implemented using a communication device 400 in FIG. 4. FIG. 4 is a schematic diagram of a structure of a communication device 400 according to an embodiment of this application. The communication device 400 includes one or more processors 401, a communication line 402, and at least one communication interface (where in FIG. 4, an example in which a communication interface 404 and one processor 401 are included is merely used for description), and optionally, may further include a memory 403.

The processor 401 may be a general-purpose central processing unit (CPU), a microprocessor, an application-specific integrated circuit (ASIC), or one or more integrated circuits configured to control program execution of the solutions in this application.

The communication line 402 may include a path for connecting different components.

The communication interface 404 may be a transceiver module configured to communicate with another device or a communication network, such as the Ethernet, a RAN, or a wireless local area network (WLAN). For example, the transceiver module may be an apparatus such as a transceiver. Optionally, the communication interface 404 may alternatively be a transceiver circuit located in the processor 401, and is configured to implement signal input and signal output of the processor 401.

The memory 403 may be an apparatus having a storage function. For example, the memory 403 may be a read-only memory (ROM) or another type of static storage device that can store static information and instructions, a random-access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer, but is not limited thereto. The memory 403 may exist independently, and is connected to the processor through the communication line 402. Alternatively, the memory 403 may be integrated with the processor 401.

The memory 403 is configured to store computer-executable instructions for executing the solutions in this application, and the execution is controlled by the processor 401. The processor 401 is configured to execute the computer-executable instructions stored in the memory 403, to implement the service processing method provided in embodiments of this application.

Alternatively, optionally, in this embodiment of this application, the processor 401 may perform functions related to processing in the service processing method provided in the following embodiments of this application. The communication interface 404 is responsible for communicating with another device or a communication network. This is not specifically limited in this embodiment of this application.

Optionally, the computer-executable instructions in embodiments of this application may also be referred to as application program code. This is not specifically limited in embodiments of this application.

During implementation, in an embodiment, the processor 401 may include one or more CPUs, for example, a CPU 0 and a CPU 1 in FIG. 4.

During implementation, in an embodiment, the communication device 400 may include a plurality of processors, for example, the processor 401 and a processor 408 in FIG. 4. Each of the processors may be a single-core processor or a multi-core processor. The processor herein may include but is not limited to at least one of the following various computing devices that run software: a CPU, a microprocessor, a digital signal processor (DSP), a microcontroller unit (MCU), an artificial intelligence processor, or the like. Each computing device may include one or more cores configured to perform an operation or processing by executing software instructions.

In implementation, in an embodiment, the communication device 400 may further include an output device 405 and an input device 406. The output device 405 communicates with the processor 401, and may display information in a plurality of manners. For example, the output device 405 may be a liquid-crystal display (LCD), a light-emitting diode (LED) display device, a cathode-ray tube (CRT) display device, or a projector. The input device 406 communicates with the processor 401, and may receive an input of a user in a plurality of manners. For example, the input device 406 may be a mouse, a keyboard, a touchscreen device, a sensor device, or the like.

The communication device 400 may also be referred to as a communication apparatus sometimes, and may be a general-purpose device or a dedicated device. For example, the communication device 400 may be a desktop computer, a portable computer, a network server, a personal digital assistant (PDA), a mobile phone, a tablet computer, a wireless terminal device, an embedded device, the foregoing terminal device, the foregoing network device, or a device having a structure similar to that in FIG. 4. A type of the communication device 400 is not limited in this embodiment of this application.

Names of messages between network elements or names of parameters in messages in the following embodiments of this application are merely examples, and may alternatively be other names during implementation. This is not specifically limited in embodiments of this application.

Methods for determining a policy control network element provided in embodiments of this application are described below in detail with reference to FIG. 1 to FIG. 4.

Figure 5:
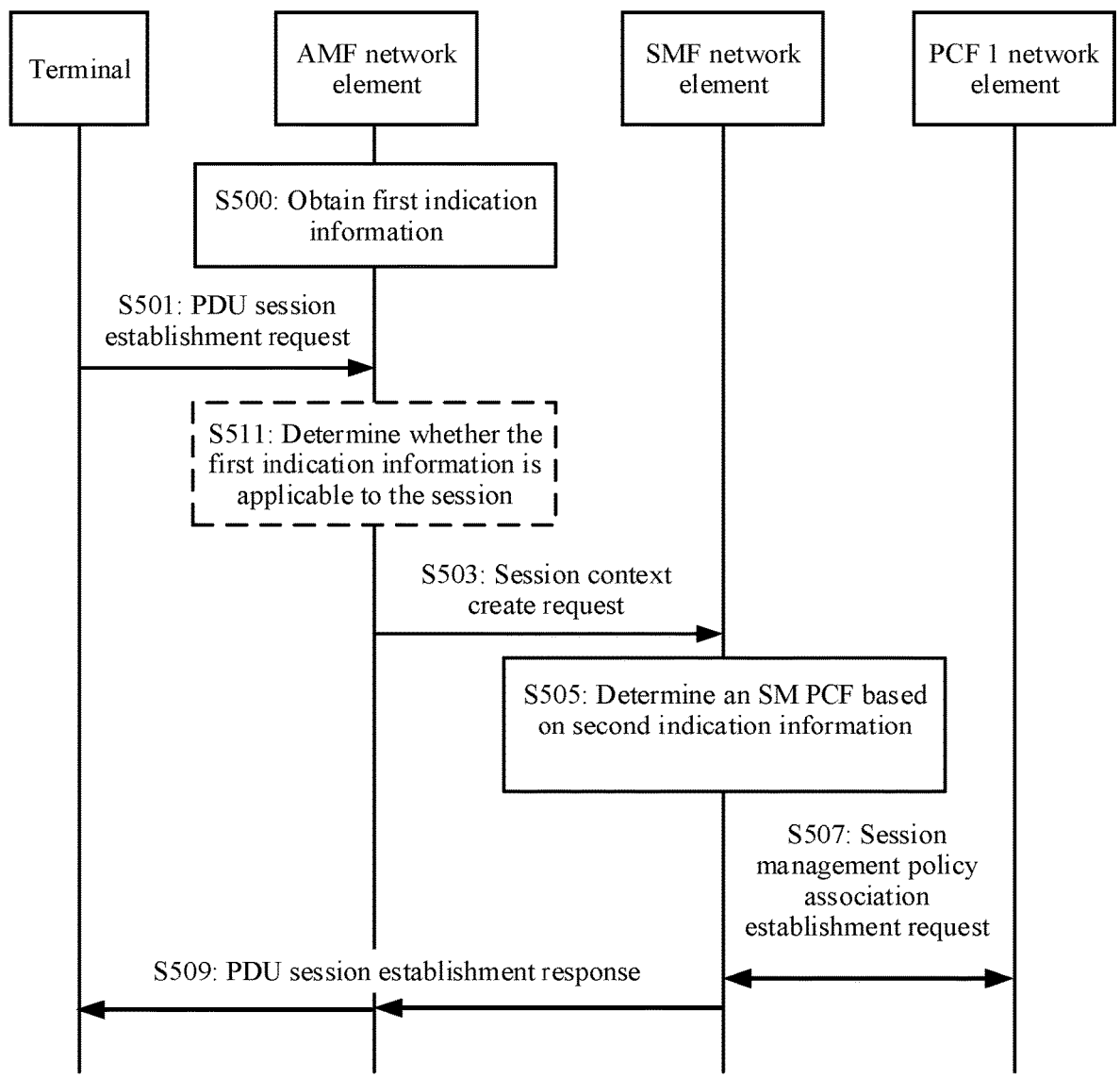
FIG. 5 is a schematic flowchart of a method according to an embodiment of this application.

A schematic flowchart of a method for determining a policy control network element is provided in FIG. 5. An example in which this embodiment is applied to a 5G system or a 4G-to-5G handover procedure is used. An example in which the policy control network element herein is a PCF is used.

S500: An AMF network element obtains first indication information.

There are a plurality of methods for the AMF network element to obtain the first indication information.

For example, the AMF may obtain an access control related context corresponding to UE from an old AMF or an old MME. The access control related context includes the first indication information and information about an AM PCF that is selected for a terminal.

The information about the AM PCF may be an identifier, an IP address, an FQDN, a URL, or the like, of the AM PCF. This is not limited herein, provided that the information about the AM PCF can be found.

S501: The terminal sends a PDU session establishment request for establishing a first PDU session, and the AMF network element receives the PDU session establishment request.

For example, the PDU session establishment request may be a PDU Session Establishment Request.

S503: The AMF network element sends, to an SMF network element based on the first indication information, a session context establishment request that carries second indication information and the information about the AM PCF, and the SMF network element receives the session context establishment request.

The second indication information indicates to select a same PCF as an SM PCF of an AM PCF network element and an SM PCF of the first PDU session.

For example, the session context establishment request may be an Nsmf_PDUSession_CreateSMContext Request.

S505: The SMF network element determines an SM PCF based on the second indication information.

For example, a PCF 1 corresponding to an AM PCF 1 information is used as an SM PCF of the terminal. The AM PCF is a PCF configured to provide access and mobility management for the terminal, and the SM PCF is a PCF configured to provide session management for the terminal.

S507: The SMF network element initiates a session management policy association establishment request to a PCF 1 network element, to establish a session management policy association SM Policy Association between the SMF network element and the PCF 1 network element, and obtain a policy rule corresponding to the session.

For example, the session management policy association establishment request may be an Npcf_SMPolicyControl_Create request message.

Optionally, in a process of establishing the session management policy association, the SMF network element stores a correspondence between the session management policy association and a first PDU session. In addition, the AF network element may further establish an AF session with the PCF 1 network element, and the PCF 1 network element binds the AF session and the first PDU session. Details are not described herein again.

S509: The SMF network element sends a PDU session establishment response to the AMF network element, and the AMF network element sends the PDU session establishment response to the terminal.

For example, if the PDU session establishment request is the PDU Session Establishment Request in S501, the PDU session establishment response is PDU Session Establishment Accept.

In implementation, the first indication information may be a DNN granularity, an S-NSSAI granularity, a DNN+S-NSSAI granularity, or a UE granularity. For example, if the first indication information is the DNN granularity, the first indication information may represent that indication information of a same PCF needs to be selected for an SM PCF and an AM PCF of a session at the DNN granularity. For example, if the first indication information is the S-NSSAI granularity, the first indication information may represent that indication information of a same PCF needs to be selected for an SM PCF and an AM PCF of a session at the S-NSSAI granularity. If the first indication information is the UE granularity, the first indication information may represent that indication information of a same PCF needs to be selected for an SM PCF and an AM PCF of a session at the UE granularity. Optionally, the first indication information may alternatively be for a session for which usage control needs to be enabled, and the first indication information may represent that indication information of a same PCF needs to be selected for an SM PCF and an AM PCF for a session for which usage control is enabled.

A relationship between the first indication information, a first DNN, and first S-NSSAI may be understood as that the first indication information is associated with the first DNN and/or the first S-NSSAI. The association herein has a plurality of representation forms, and two forms are listed below.

In an implementation, the first indication information may include the first DNN and/or the first S-NSSAI. For example, the AMF network element obtains the first indication information from a UDM network element. It may be in this form:

AM Subscription Data→
PCF Selection Assistance Info→
DNN 1/S-NSSAI 1, DNN 2/S-NSSAI 2.

To be more specific, in AM-related subscription information obtained by the AMF network element from the UDM network element, PCF selection assistance information (corresponding to the first indication information) is used as a second-level directory, and the directory includes one or more condition options for selecting a same AM PCF and SM PCF: DNN 1/S-NSSAI 1, DNN 2/S-NSSAI 2.

In another implementation, for example, the AMF network element obtains the first indication information from the UDM network element. It may be in this form:

AM Subscription Data→
PCF Selection Assistance Info→
S-NSSAI 1/DNN 1, Indication of Same PCF;
S-NSSAI 2/DNN 2, Indication of Same PCF.

To be more specific, in AM-related subscription information obtained by the AMF network element from the UDM network element, PCF selection assistance information is used as a second-level directory, and the directory includes one or more condition options for selecting a same AM PCF and SM PCF: DNN 1/S-NSSAI 1, DNN 2/S-NSSAI 2. Indication of Same PCF corresponds to the first indication information. In an implementation, step S511 is further included.

The second indication information may be independent indication information, or may be the same as the first indication information. Details are not described in this application.

For example, in S501, the PDU session establishment request may further carry the first DNN and/or the first S-NSSAI. In this case, after receiving the PDU session establishment request, the AMF network element determines, in S511, whether the first indication information is applicable to the first DNN and/or the first S-NSSAI. Optionally, whether the first indication information is applicable to the first DNN and/or the first S-NSSAI may be determined by determining whether a DNN/S-NSSAI corresponding to a first session is consistent with a DNN/S-NSSAI associated with the first indication information. For example, if the first DNN and/or the first S-NSSAI included in the PDU session establishment request exist/exists in DNN information and/or S-NSSAI information associated with the first indication information, for example, if a session establishment request initiated by the UE carries DNN 1+S-NSSAI 1, and the combination is included in the foregoing two examples of the first indication information, the AMF performs step S503. Otherwise, the AMF determines that a same AM PCF and SM PCF do not need to be selected in this case, and does not include the second indication information in a session management request message sent to the SMF.

Based on the method for determining a policy control network element provided in this embodiment, flexible policy association can be implemented without introducing network architecture complexity.

Actions of the AMF network element or actions of the SMF network element in the foregoing steps may be performed by the processor 401 in the communication device 400 shown in FIG. 4 by invoking the application program code stored in the memory 403. This is not limited in this embodiment.

Figure 6:
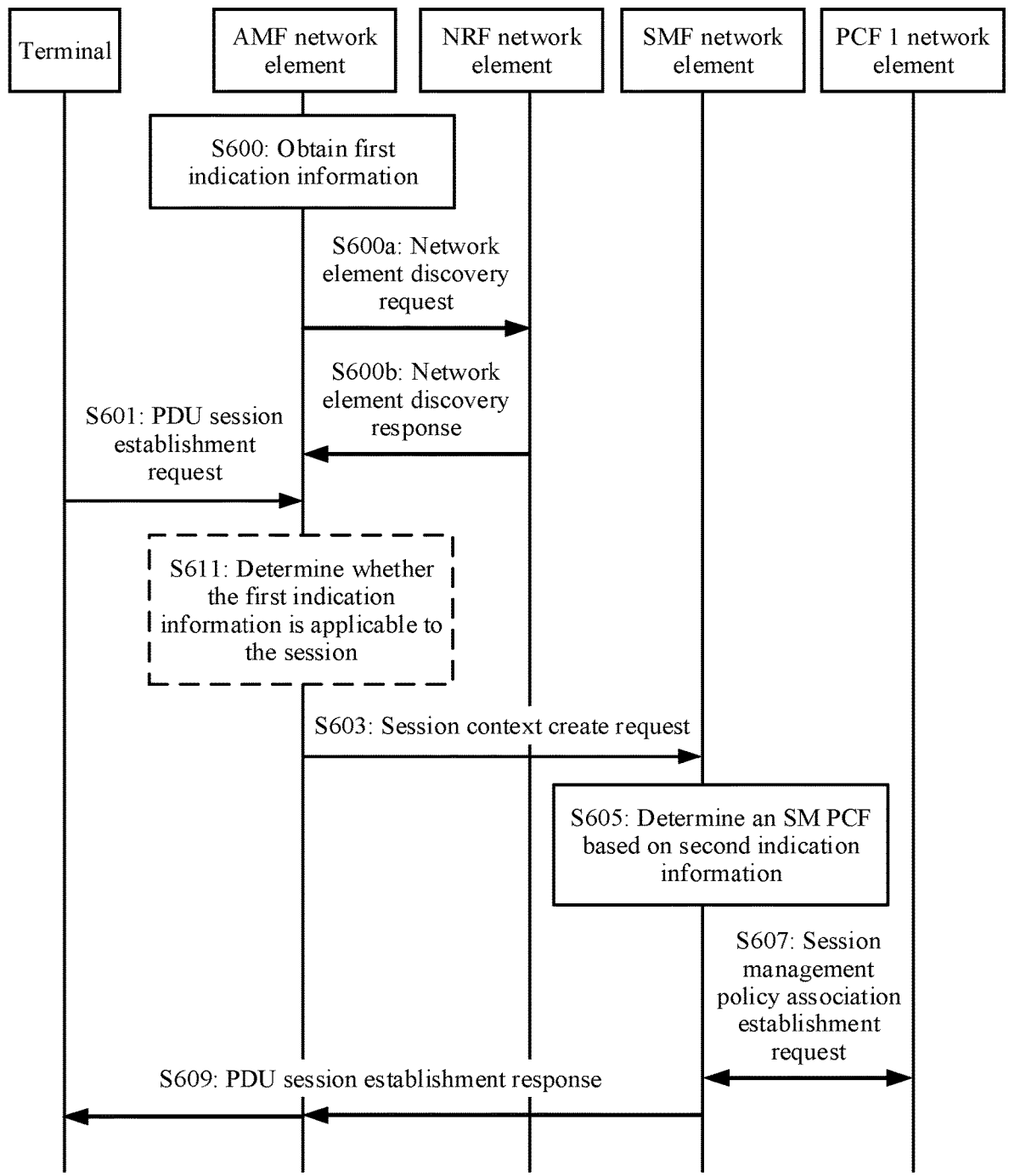
FIG. 6 is a schematic flowchart of another method according to an embodiment of this application.

A schematic flowchart of another method for determining a policy control network element is provided in FIG. 6. An example in which this embodiment is applied to a 5G system or a 4G-to-5G handover procedure is used. An example in which the policy control network element herein is a PCF is used.

S600: An AMF network element obtains first indication information.

The AMF network element obtains the first indication information from subscription data sent by a UDM.

S600a: The AMF network element sends a network element discovery request to an NRF network element, and the NRF network element receives the network element discovery request.

The network element discovery request carries function requirement information of an AM PCF and an SM PCF.

S600b: The AMF network element receives a network element discovery response sent by the NRF network element.

The network element discovery response includes information about a PCF 1 network element, and the PCF 1 network element supports providing functions of the SM PCF and the AM PCF.

S601 to S609 are the same as S501 to S509.

Optionally, S611 is further included. This step is the same as S511.

Actions of the AMF network element or actions of an SMF network element in the foregoing steps may be performed by the processor 401 in the communication device 400 shown in FIG. 4 by invoking the application program code stored in the memory 403. This is not limited in this embodiment.

Figure 7:
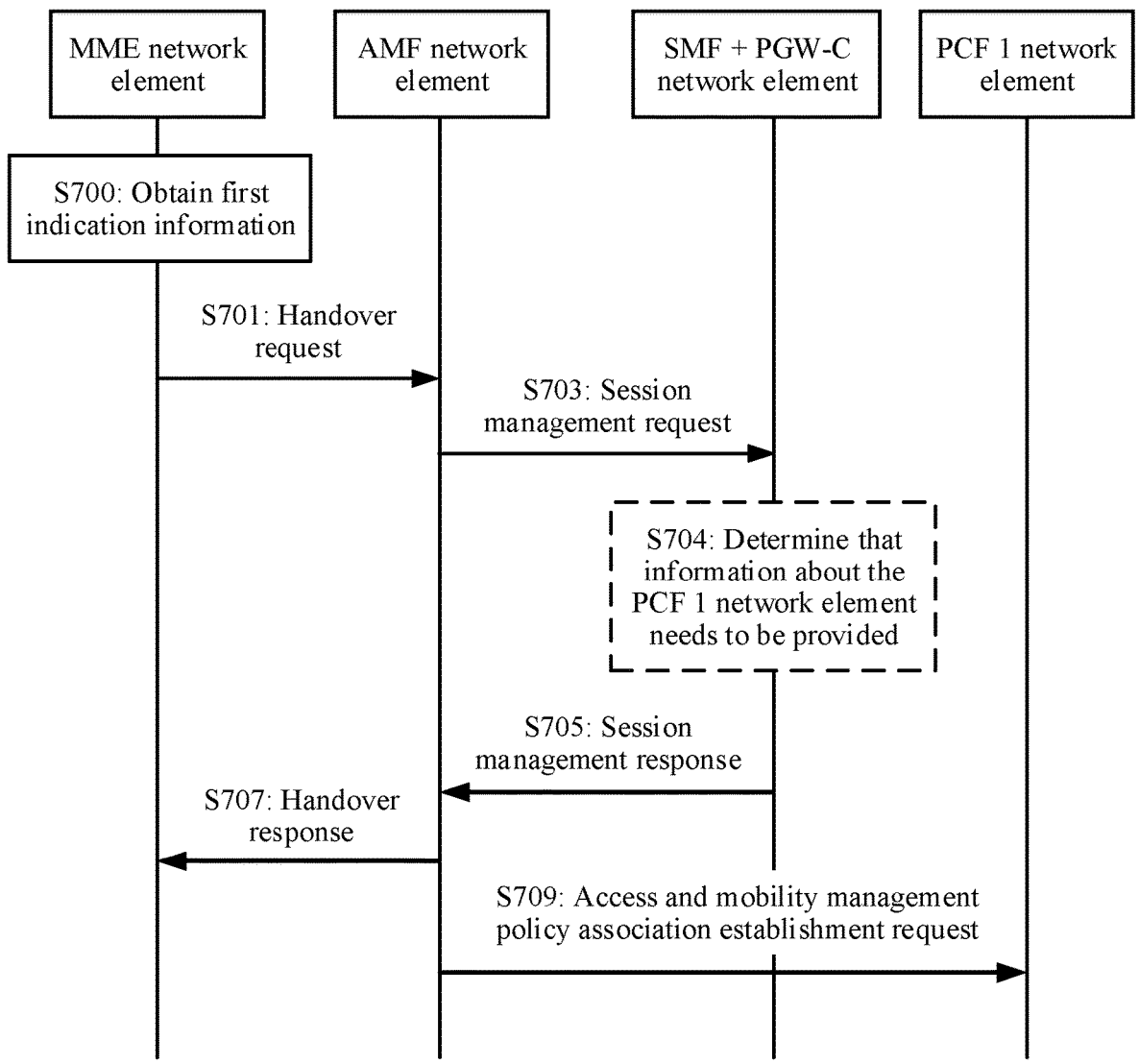
FIG. 7 is a schematic flowchart of another method according to an embodiment of this application.

A schematic flowchart of another method for determining a policy control network element is provided in FIG. 7. An example in which this embodiment is applied to a 4G-to-5G handover procedure is used. An example in which the policy control network element herein is a PCF is used.

S700: An MME network element obtains first indication information.

For example, there are a plurality of methods for obtaining the first indication information by the MME network element.

For example, the first indication information may be obtained from an HSS network element using a 4G attach procedure, or may be obtained from a source MME network element (an MME serving a terminal before mobility changes) using a 4G-4G mobility change procedure, or may be obtained from a source AMF (an AMF serving the terminal in 5G) using a 5G-4G mobility change procedure. Alternatively, in a mobility registration scenario, a new AMF network element may actively obtain the first indication information from an old AMF network element or an old MME network element.

Herein, a handover procedure is used as an example for description, that is, a handover request is used as an example for description of the mobility change request.

S701: The MME network element sends, to an AMF network element, a handover request that carries the first indication information, and the AMF network element receives the handover request.

For example, the handover request may be a forward relocation request. Herein, the AMF network element corresponds to a mobility management network element after a mobility change.

S703: The AMF network element sends, to an SMF+a PGW-C network element, a session management request that carries second indication information and that is of a first session, and the SMF+the PGW-C network element receive the session management request.

For example, the session management request may be a session context create request. The session context create request may be an SM context create request (Create SM Context Request).

For example, the session management request may be a session context update request. The session context update request may be an SM context update request (Update SM Context Request).

Optionally, the AMF network element further needs to determine an SMF of a first session corresponding to a DNN and/or S-NSSAI corresponding to the first indication information.

Optionally, in S704, the SMF+the PGW-C network element determine, based on the second indication information, that a PCF 1 network element configured to provide session management for a first session of the terminal needs to be provided.

S705: The SMF+the PGW-C network element send, to the AMF network element, a session management response that carries information about a PCF 1, and the AMF network element receives the session management response.

For example, the session management response may be a session context create response. The session context create response may be an SM context create response (Create SM Context Response).

For example, the session management response may be a session context update response. The session context update response may be an SM context update response (Update SM Context Response).

The PCF 1 is an SM PCF selected by the SMF for the first session of the terminal.

S707: The AMF network element sends, to the MME network element, a handover response that carries PCF selection indication information, and the MME network element receives the handover response.

For example, the handover response may be a forward relocation response.

S709: The AMF network element sends an access and mobility management policy association establishment request to the PCF 1 network element corresponding to information about the PCF 1 network element, where the access and mobility management policy association establishment request is used to trigger creation of an access and mobility management policy association (AM policy Association). The PCF 1 network element receives the access and mobility management policy association establishment request.

For example, the access and mobility management policy association establishment request may be an Npcf access management policy control establishment request (Npcf_AMPolicyControl_Create Request).

There is no sequence between S707 and S709.

Optionally, the AMF network element may further send a user policy association establishment request to the PCF 1 network element. The user policy association establishment request is used to trigger creation of a UE policy association.

For example, the UE policy association establishment request may be an Npcf UE policy control establishment request (Npcf_UEPolicyControl_Create Request).

In an implementation, the procedure may also be triggered in a mobility registration scenario. In this case, the message in step S701 corresponds to a request message that the AMF network element obtains a mobility context of the UE in the EPC from the MME network element, and the message in step S707 corresponds to a response message that the AMF network element obtains the mobility context of the UE in the EPC from the MME network element. After receiving a UE mobility context returned by the MME in S707, the AMF network element continues to perform corresponding actions with reference to S703 to S705 and S709 in the foregoing descriptions.

In an implementation, based on the method provided in FIG. 7, the method in FIG. 5 or FIG. 6 may be further performed.

Based on the method for determining a policy control network element provided in this embodiment, flexible policy association can be implemented without introducing network architecture complexity.

Actions of the AMF network element or actions of the SMF network element in the foregoing steps may be performed by the processor 401 in the communication device 400 shown in FIG. 4 by invoking the application program code stored in the memory 403. This is not limited in this embodiment.

Figure 8:
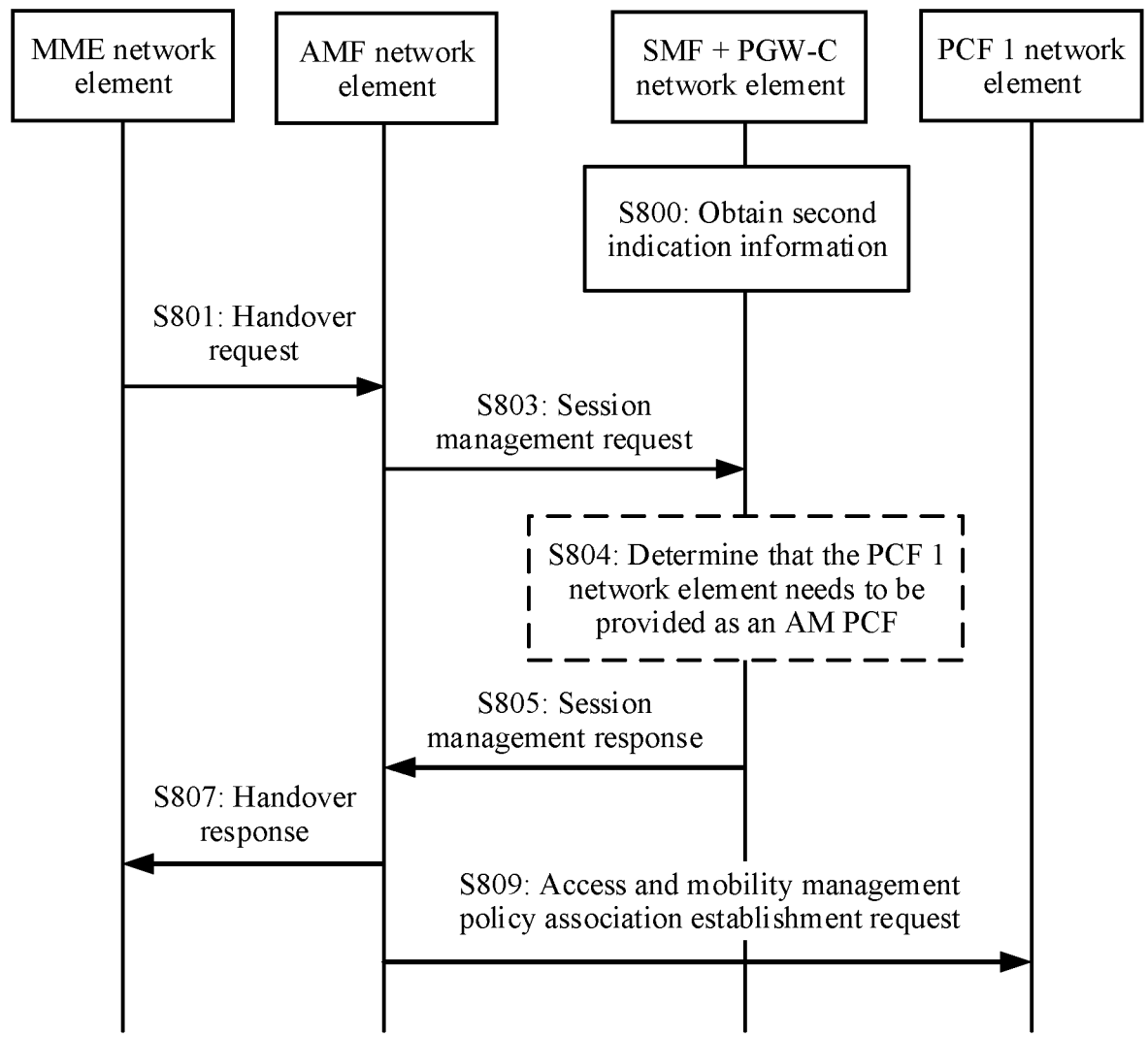
FIG. 8 is a schematic flowchart of another method according to an embodiment of this application.

A schematic flowchart of another method for determining a policy control network element is provided in FIG. 8. An example in which this embodiment is applied to a 4G-to-5G handover procedure is used. An example in which the policy control network element herein is a PCF is used.

S800: An SMF+a PGW-C network element obtain second indication information.

For example, there are a plurality of methods for obtaining the second indication information by the SMF+the PGW-C network element. For example, the second indication information may be obtained using an MME network element, an old AMF, or a UDM/HSS.

S801: The MME network element sends a handover request to an AMF network element, and the AMF network element receives the handover request.

For example, the handover request may be a forward relocation request).

S803: The AMF network element sends a session management request to the SMF+the PGW-C network element, and the SMF+the PGW-C network element receive the session management request.

For example, the session management request may be a session context create request. The session context create request may be an SM context create request (Create SM Context Request).

For example, the session management request may be a session context update request. The session context update request may be an SM context update request (Update SM Context Request).

Optionally, in S804, the SMF+the PGW-C network element determines, based on the second indication information, that a PCF 1 network element configured to provide session management for the terminal needs to be provided.

S805 is the same as S705.

In implementation, in S805, the session management response may alternatively carry third indication information. The third indication information is used by the AMF to determine, when subsequently receiving a new session establishment request, whether a PCF instance (namely, a PCF 1) the same as the PCF needs to be selected as an SM PCF. For example, the third indication information may be independent indication information, or may be the same as or equivalent to the second indication information.

S807 to S809 are the same as S707 to S709.

In an implementation, the procedure may also be triggered in a mobility registration scenario. In this case, the message in step S801 corresponds to a request message that the AMF network element obtains a mobility context of the UE in the EPC from the MME network element, and the message in step S807 corresponds to a response message that the AMF network element obtains the mobility context of the UE in the EPC from the MME network element. After receiving a UE mobility context returned by the MME in S807, the AMF network element continues to perform corresponding actions with reference to S703 to S705 and S709 in the foregoing descriptions.

Based on the method for determining a policy control network element provided in this embodiment, flexible policy association can be implemented without introducing network architecture complexity.

Actions of the AMF network element or actions of an SMF network element in the foregoing steps may be performed by the processor 401 in the communication device 400 shown in FIG. 4 by invoking the application program code stored in the memory 403. This is not limited in this embodiment.

It may be understood that in the foregoing embodiments, methods and/or steps implemented by the mobility management network element may also be implemented by a component (for example, a chip or a circuit) that can be used in the mobility management network element, and methods and/or steps implemented by the session management network element may also be implemented by a component (for example, a chip or a circuit) that can be used in the session management network element.

The foregoing mainly describes the solutions provided in embodiments of this application from the perspective of interaction between network elements. Correspondingly, an embodiment of this application further provides a communication apparatus. The communication apparatus may be the mobility management network element in the foregoing method embodiments, or an apparatus including the mobility management network element, or a component that can be used in the mobility management network element.

Alternatively, the communication apparatus may be the session management network element in the foregoing method embodiments, or an apparatus including the session management network element, or a component that can be used in the session management network element. It may be understood that, to implement the foregoing functions, the communication apparatus includes a corresponding hardware structure and/or software module for performing the functions. A person skilled in the art should be easily aware that, in combination with the examples of units and algorithm steps described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 9:
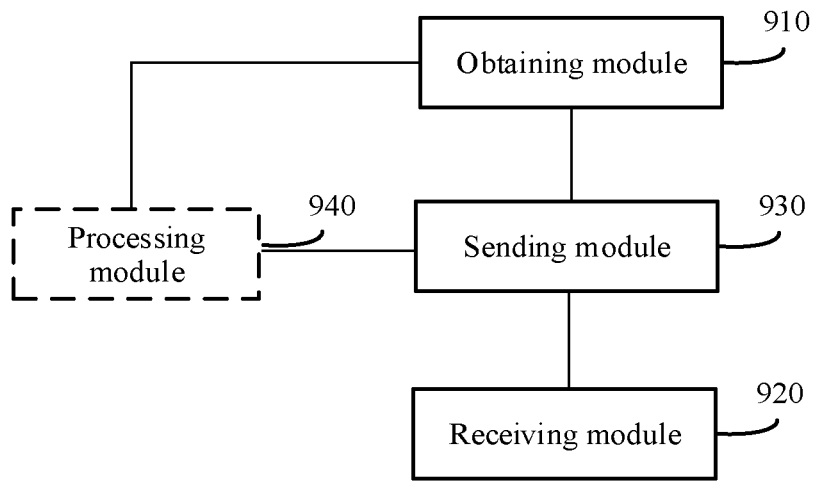
FIG. 9 is a schematic diagram of a structure of an apparatus according to an embodiment of this application.

For example, the communication apparatus is the mobility management network element in FIG. 5 and FIG. 6 in the method embodiments. FIG. 9 is a schematic diagram of a structure of a mobility management network element 900. The mobility management network element 900 includes an obtaining module 910, a receiving module 920, and a sending module 930. The receiving module 920 and the sending module 930 may also be referred to as a transceiver module configured to implement a sending function and a receiving function, for example, may be a transceiver circuit, a transceiver, or a communication interface. Details are described below.

The obtaining module 910 is configured to obtain first indication information, where the first indication information indicates to select a same policy control network element as a policy control network element used for access and mobility management and a policy control network element used for session management; the receiving module 920 is configured to receive a session establishment request from a terminal for establishing a first session; and the sending module 930 is configured to send second indication information and information about a first policy control network element to a session management network element, where the second indication information indicates to select a same policy control network element as a policy control network element used for access and mobility management and a policy control network element used for session management of the first session; and the information about the first policy control network element is used by the session management network element to use a first policy control network element corresponding to the information about the first policy control network element as a second policy control network element of the first session, where the first policy control network element is a policy control network element configured to provide access and mobility management for the terminal, and the second policy control network element is a policy control network element configured to provide session management for the first session.

In an implementation, the first indication information is associated with a DNN and/or first S-NSSAI; and the mobility management network element 900 further includes a processing module 940 configured to determine that the first indication information is applicable to a first DNN and/or first S-NSSAI carried in the session establishment request.

In an implementation, the sending module 930 is further configured to send a network element discovery request to a network repository function network element, where the network element discovery request carries function requirement information of a policy control network element configured to provide access and mobility management for the terminal and a policy control network element configured to provide session management for a session of the terminal; and the receiving module 920 is further configured to receive information about the first policy control network element returned by the network repository function network element, where the first policy control network element supports providing functions of the first policy control network element and the second policy control network element.

In this embodiment, the mobility management network element 900 is presented by dividing the function modules through integration. The "module" herein may be an ASIC, a circuit, a processor and a memory that execute one or more software or firmware programs, an integrated logic circuit, and/or another component that can provide the foregoing functions. In a simple embodiment, a person skilled in the art may figure out that the mobility management network element 900 may be in a form of the communication device 400 shown in FIG. 4.

For example, the processor 401 of the communication device 400 shown in FIG. 4 may invoke the computer-executable instructions stored in the memory 403, to enable the communication device 400 to perform the method for determining a policy control network element in the foregoing method embodiments.

For example, the functions/implementation processes of the obtaining module 910, the receiving module 920 and the sending module 930 in FIG. 9 may be implemented by the processor 401 in the communication device 400 shown in FIG. 4 by invoking the computer-executable instructions stored in the memory 403. Alternatively, a function/implementation process of the processing module 940 in FIG. 9 may be implemented by the processor 401 in the communication device 400 shown in FIG. 4 by invoking the computer-executable instructions stored in the memory 403, and functions/implementation processes of the obtaining module 910, the receiving module 920 and the sending module 930 in FIG. 9 may be implemented by the communication interface 404 of the communication device 400 shown in FIG. 4.

Because the mobility management network element 900 provided in this embodiment may perform the foregoing method for determining a policy control network element, for a technical effect that can be achieved by the mobility management network element 900, refer to the foregoing method embodiments. Details are not described herein again.

Figure 10:
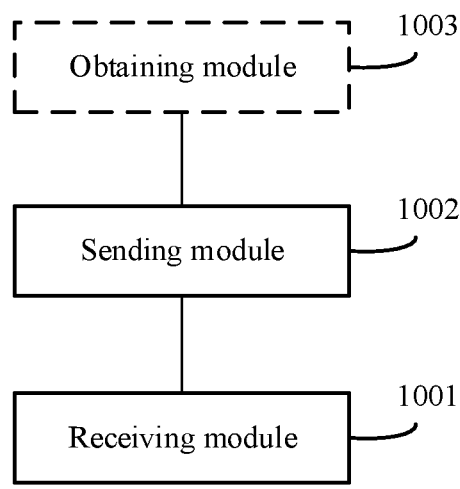
FIG. 10 is a schematic diagram of a structure of another apparatus according to an embodiment of this application.

Alternatively, for example, the communication apparatus is the session management network element in FIG. 7 and FIG. 8 in the method embodiments. FIG. 10 is a schematic diagram of a structure of a session management network element 1000. The session management network element 1000 includes a receiving module 1001 and a sending module 1002. The receiving module 1001 and the sending module 1002 may also be referred to as a transceiver unit configured to implement a sending function and/or a receiving function, for example, may be a transceiver circuit, a transceiver, or a communication interface.

The receiving module 1001 is configured to receive a session management request of a first session from a mobility management network element; and the sending module 1002 is configured to send, to the mobility management network element based on second indication information, a session management response that carries information about a second policy control network element, where the second indication information indicates to select a same policy control network element as a policy control network element used for access and mobility management and a policy control network element used for session management of the first session; and the information about the second policy control network element is used by the mobility management network element to use a policy control network element corresponding to the information about the second policy control network element as a first policy control network element, where the first policy control network element is a policy control network element configured to provide access and mobility management for the terminal, and the second policy control network element is a policy control network element configured to provide session management for the first session.

In an implementation, the session management request further carries the second indication information.

In an implementation, the session management network element 1000 further includes an obtaining module 1003 configured to obtain the second indication information from a unified data management network element; or obtain the second indication information from a mobility management network element before a mobility change.

In this embodiment, the session management network element 1000 is presented by dividing the function modules through integration. The "module" herein may be an ASIC, a circuit, a processor and a memory that execute one or more software or firmware programs, an integrated logic circuit, and/or another component that can provide the foregoing functions. In a simple embodiment, a person skilled in the art may figure out that the session management network element 1000 may be in a form of the communication device 400 shown in FIG. 4.

For example, the processor 401 of the communication device 400 shown in FIG. 4 may invoke the computer-executable instructions stored in the memory 403, to enable the communication device 400 to perform the method for determining a policy control network element in the foregoing method embodiments.

For example, the functions/implementation processes of the receiving module 1001, the sending module 1002 and the obtaining module 1003 in FIG. 10 may be implemented by the processor 401 in the communication device 400 shown in FIG. 4 by invoking the computer-executable instructions stored in the memory 403. Alternatively, functions/implementation processes of the receiving module 1001, the sending module 1002, and the obtaining module 1003 in FIG. 10 may be implemented by the communication interface 404 in the communication device 400 shown in FIG. 4.

Figure 11:
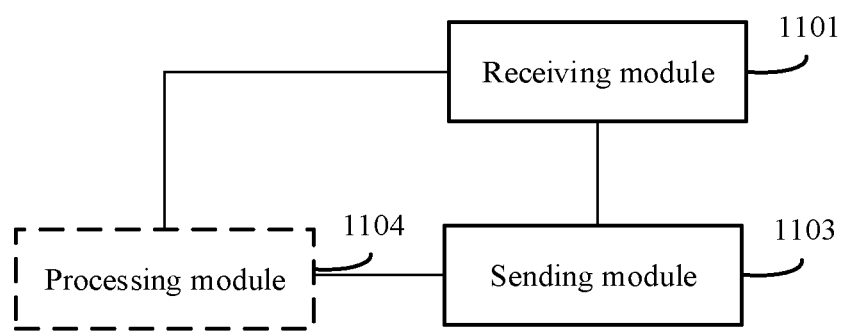
FIG. 11 is a schematic diagram of a structure of another apparatus according to an embodiment of this application.

Alternatively, for example, the communication apparatus is the session management network element in FIG. 7 in the method embodiments. FIG. 11 is a schematic diagram of a structure of a session management network element 1100. The session management network element 1100 includes a receiving module 1101 and a sending module 1103. The receiving module 1101 and the sending module 1103 may also be referred to as a transceiver module configured to implement a sending function and/or a receiving function, for example, may be a transceiver circuit, a transceiver, or a communication interface. Details are described below.

The receiving module 1101 is configured to receive a mobility change request, where the mobility change request carries first indication information, where the first indication information indicates to select a same policy control network element as a policy control network element used for access and mobility management and a policy control network element used for session management; the sending module 1103 is configured to send, to a session management network element corresponding to a first session of a terminal, a session management request that carries second indication information; and the second indication information indicates to select a same policy control network element as a policy control network element used for access and mobility management and a policy control network element used for session management of the first session; the receiving module 1101 is further configured to receive a session management response from the session management network element, and the session management response carries information about a first policy control network element that provides session management for the terminal; and the sending module 1103 is further configured to send a session management policy association establishment request to the first policy control network element, where the session management policy association establishment request is used to trigger to establish access management policy association.

In an implementation, if the first indication information is associated with a first DNN and/or first S-NSSAI, the session management network element further includes a processing module 1104 configured to determine that the first indication information is applicable to a DNN and/or S-NSSAI corresponding to the first session.

In this embodiment, the session management network element 1100 is presented by dividing the function modules through integration. The "module" herein may be an ASIC, a circuit, a processor and a memory that execute one or more software or firmware programs, an integrated logic circuit, and/or another component that can provide the foregoing functions. In a simple embodiment, a person skilled in the art may figure out that the session management network element 1100 may be in a form of the communication device 400 shown in FIG. 4.

For example, the processor 401 of the communication device 400 shown in FIG. 4 may invoke the computer-executable instructions stored in the memory 403, to enable the communication device 400 to perform the method for determining a policy control network element in the foregoing method embodiments.

For example, the functions/implementation processes of the receiving module 1101 and the sending module 1103 in FIG. 11 may be implemented by the processor 401 in the communication device 400 shown in FIG. 4 by invoking the computer-executable instructions stored in the memory 403. Alternatively, a function/implementation process of the processing module 1104 in FIG. 11 may be implemented by the processor 401 in the communication device 400 shown in FIG. 4 by invoking the computer-executable instructions stored in the memory 403, and functions/implementation processes of the receiving module 1101 and the sending module 1103 in FIG. 11 may be implemented by the communication interface 404 in the communication device 400 shown in FIG. 4.

Because the session management network element 1100 provided in this embodiment may perform the foregoing method for determining a policy control network element, for a technical effect that can be achieved by the session management network element 1100, refer to the foregoing method embodiments. Details are not described herein again.

All related content of the steps in this method embodiment may be cited in function descriptions of corresponding functional modules. Details are not described herein again.

It should be noted that one or more of the foregoing modules or units may be implemented using software, hardware, or a combination thereof. When any one of the foregoing modules or units is implemented by software, the software exists in a form of computer program instructions, and is stored in the memory. The processor may be configured to execute the program instructions and implement the foregoing method procedure. The processor may be built into a SoC (system-on-a-chip) or an ASIC, or may be an independent semiconductor chip. In addition to a core for executing software instructions to perform operations or processing, the processor may further include a necessary hardware accelerator, for example, a field programmable gate array (FPGA), a PLD (programmable logic device), or a logic circuit that implements a special-purpose logic operation.

When the foregoing modules or units are implemented using hardware, the hardware may be any one or any combination of a CPU, a microprocessor, a DSP chip, an MCU, an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

Optionally, an embodiment of this application further provides a communication apparatus (for example, the communication apparatus may be a chip or a chip system). The communication apparatus includes a processor configured to implement the method in any one of the foregoing method embodiments. In a possible design, the communication apparatus further includes a memory. The memory is configured to store necessary program instructions and necessary data. The processor may invoke program code stored in the memory, to indicate the communication apparatus to perform the method in any one of the foregoing method embodiments. Certainly, the communication apparatus may not include the memory. When the communication apparatus is a chip system, the communication apparatus may include a chip, or may include a chip and another discrete component. This is not specifically limited in this embodiment of this application.

All or some of the foregoing embodiments may be implemented by software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, the term "comprise" (comprising) does not exclude another component or another step, and "a" or "one" does not exclude a case of plurality. A single processor or another unit may implement a plurality of functions enumerated in the claims. Some measures are set forth in dependent claims that are different from each other, but this does not mean that these measures cannot be combined to produce a great effect.

Although this application is described with reference to example features and all the embodiments thereof, it is clear that various modifications and combinations may be made to them without departing from the spirit and scope of this application. Correspondingly, this specification and the accompanying drawings are merely example description of this application defined by the appended claims, and are considered as any or all of modifications, variations, combinations or equivalents that cover the scope of this application. It is clear that a person skilled in the art can make various modifications and variations to this application without departing from the spirit and scope of this application. In this way, this application is intended to cover the modifications and variations of this application provided that they fall within the scope of the claims of this application and their equivalent technologies.

What is claimed is:

1. A method for determining at least one policy control network element, the method comprising:
   obtaining, by a mobility management network element, first indication information from a unified data management network element, wherein the first indication information is associated with subscription data, and the first indication information indicates to select a single policy control network element to be used for access and mobility management for terminal and for session management of a first session;
   receiving, by the mobility management network element from the terminal, a session establishment request for establishing the first session; and
   sending, by the mobility management network element in response to the session establishment request, when the first indication information indicates to select a single policy control network element to be used for access and mobility management for the terminal and for session management of the first session, second indication information and first information to a session management network element over an interface between the mobility management network element and the session management network element,
   wherein the first information identifies a first policy control network element,
   wherein the second indication information indicates to select a same policy control network element to be used for access and mobility management for the terminal and for session management of the first session,
   wherein the mobility management network element determines the first policy control network element based on the first information corresponding to the first policy control network element, and wherein the first policy control network element corresponding to the first information provides access and mobility management for the terminal and is used as a second policy control network element to provide session management of the first session.

2. The method of claim 1, wherein the session establishment request comprises at least one of a first data network name (DNN) or a first single network slice selection assistance information (S-NSSAI), wherein sending the second indication information comprises sending the second indication information and the first information to the session management network element when the at least one of the first DNN or the first S-NSSAI is the same as at least one of another DNN or another S-NSSAI in the first indication information.

3. The method of claim 1, wherein when the mobility management network element is a second mobility management network element after a mobility change, the method further comprises obtaining, by the mobility management network element, the first indication information from a first mobility management network element before the mobility change.

4. The method of claim 1, further comprising:
sending, by the mobility management network element, a network element discovery request to a network repository function network element, wherein the network element discovery request carries function requirement information of the first policy control network element and the second policy control network element; and
receiving, by the mobility management network element, the first information from the network repository function network element, wherein the first policy control network element supports providing functions of the first policy control network element and the second policy control network element.

5. An apparatus for determining at least one policy control network element, comprising:
one or more processors; and
a memory coupled to the one or more processors and configured to store instructions to be executed by the one or more processors to cause the apparatus to:
obtain first indication information;
receive, from a terminal, a session establishment request for establishing a first session from a unified data management network element, wherein the first indication information is associated with subscription data, and the first indication information indicates to select a single policy control network element to be used for access and mobility management for the terminal and for session management of the first session; and
send, in response to the session establishment request, when the first indication information indicates to select a single policy control network element to be used for access and mobility management for the terminal and for session management of the first session, second indication information and first information to a session management network element over an interface between the apparatus and the session management network element,
wherein the first information identifies a first policy control network element,
wherein the second indication information indicates to select a same policy control network element to be used for access and mobility management for the terminal and for session management of the first session, wherein the instructions, when executed by the one or more processors, further cause the apparatus to determine the first policy control network element based on the first information corresponding to the first policy control network element, and
wherein the first policy control network element corresponding to the first information provides access and mobility management for the terminal and is used as a second policy control network element to provide session management of the first session.

6. The apparatus of claim 5, wherein the instructions, when executed by the one or more processors, further cause the apparatus to send the second indication information and the first information by sending the second indication information and the first information to the session management network element when at least one of a first data network name (DNN) or a first single network slice selection assistance information (S-NSSAI) in the session establishment request is the same as at least one of another DNN or another S-NSSAI in the first indication information.

7. The apparatus of claim 5, wherein the instructions, when executed by the one or more processors, further cause the apparatus to:
send a network element discovery request to a network repository function network element, wherein the network element discovery request carries function requirement information of the first policy control network element and the second policy control network element; and
receive the first information from the network repository function network element, wherein the first policy control network element supports providing functions of the first policy control network element and the second policy control network element.

8. A method for determining at least one policy control network element, the method comprising:
obtaining, by a mobility management network element, first indication information from a unified data management network element, wherein the first indication information is associated with subscription data, and the first indication information indicates to select a single policy control network element to be used for access and mobility management for a terminal and for session management of a first session;
receiving, by the mobility management network element from the terminal, a session establishment request for establishing the first session;
sending, by the mobility management network element in response to the session establishment request, when the first indication information indicates to select a single policy control network element to be used for access and mobility management for the terminal and for session management of the first session, second indication information and first information to a session management network element over an interface between the mobility management network element and the session management network element, wherein the first information identifies a first policy control network element, wherein the second indication information indicates to select a same policy control network element to be used for access and mobility management for the terminal and for session management of the first session, wherein the mobility management network element determines the first policy control network element based on the first information corresponding to the first policy control network element, and wherein the first policy control network element corresponding to the first information provides access and mobility management for the terminal and is used as a second policy control network element of the first session; and receiving, by the session management network element, the second indication information and the first information from the mobility management network element.

9. The method of claim 8, further comprising determining, by the session management network element according to the second indication information and the first information, the first policy control network element as the second policy control network element of the first session.

10. The method of claim 8, wherein sending the second indication information and the first information comprises sending the second indication information and the first information to the session management network element when at least one of a first data network name (DNN) or a first single network slice selection assistance information (S-NSSAI) in the session establishment request is the same as at least one of another DNN or another S-NSSAI in the first indication information.

11. The method of claim 8, wherein when the mobility management network element is a second mobility management network element after a mobility change, the method further comprises obtaining, by the mobility management network element, the first indication information from a first mobility management network element before the mobility change.

12. The method of claim 8, further comprising:
sending, by the mobility management network element, a network element discovery request to a network repository function network element, wherein the network element discovery request carries function requirement information of the first policy control network element and the second policy control network element;
receiving, by the network repository function network element, the network element discovery request;
sending, by the network repository function network element, the first information to the mobility management network element; and
receiving, by the mobility management network element from the network repository function network element, the first information of the first policy control network element, wherein the first policy control network element supports providing functions of the first policy control network element and the second policy control network element.

13. A system for determining at least one policy control network element, the system comprising:
a mobility management network element configured to:
obtain first indication information from a unified data management network element, wherein the first indication information is associated with subscription data, and the first indication information indicates to select a single policy control network element to be used for access and mobility management for a terminal and for session management of a first session;
receive a session establishment request from the terminal for establishing the first session; and
send, in response to the session establishment request, when the first indication information indicates to select a single policy control network element to be used for access and mobility management for the terminal and for session management of the first session, second indication information and first information to a session management network element over an interface between the mobility management network element and the session management network element, wherein the first information identifies a first policy control network element, wherein the second indication information indicates to select a same policy control network element to be used for access and mobility management for the terminal and for session management of the first session, wherein the mobility management network element determines the first policy control network element based on the first information corresponding to the first policy control network element, and wherein the first policy control network element corresponding to the first information provides access and mobility management for the terminal and is used as a second policy control network element of the first session; and
a session management network element configured to receive the second indication information and the first information from the mobility management network element.

14. The system of claim 13, wherein the session management network element is further configured to determine, according to the second indication information and the first information, the first policy control network element as the second policy control network element of the first session.

15. The system of claim 13, wherein the mobility management network element is further configured to send the second indication information and the first information to the session management network element when at least one of a first data network name (DNN) or a first single network slice selection assistance information (S-NSSAI) in the session establishment request is the same as at least one of another DNN or another S-NSSAI in the first indication information.

16. The system of claim 13, wherein the mobility management network element is further configured to obtain the first indication information from a first mobility management network element before a mobility change when the mobility management network element is a second mobility management network element after the mobility change.

* * * * *